US011448621B2

(12) United States Patent
Zhang et al.

(10) Patent No.: US 11,448,621 B2
(45) Date of Patent: Sep. 20, 2022

(54) ULTRASOUND PROBE WITH ROW-COLUMN ADDRESSED ARRAY

(71) Applicant: Olympus NDT Canada Inc., Québec (CA)

(72) Inventors: Jinchi Zhang, Quebec (CA); Frederic Landry, Quebec (CA); Benoit Lepage, L'Ancienne-Lorette (CA)

(73) Assignee: Olympus NDT Canada Inc., Québec (CA)

( * ) Notice: Subject to any disclaimer, the term of this patent is extended or adjusted under 35 U.S.C. 154(b) by 22 days.

(21) Appl. No.: 16/833,793

(22) Filed: Mar. 30, 2020

(65) Prior Publication Data

US 2021/0302383 A1    Sep. 30, 2021

(51) Int. Cl.
*G01N 29/24* (2006.01)
*G01N 29/265* (2006.01)
*G01N 29/04* (2006.01)

(52) U.S. Cl.
CPC ......... *G01N 29/2437* (2013.01); *G01N 29/04* (2013.01); *G01N 29/24* (2013.01); *G01N 29/265* (2013.01); *G01N 2291/0234* (2013.01); *G01N 2291/0289* (2013.01); *G01N 2291/044* (2013.01); *G01N 2291/106* (2013.01); *G01N 2291/267* (2013.01)

(58) Field of Classification Search
CPC .. G01N 29/04; G01N 29/2437; G01N 29/265; G01N 29/24; G01N 2291/106; G01N 2291/044; G01N 2291/0234; G01N 2291/267; G01N 2291/0289
USPC .......................................................... 73/618
See application file for complete search history.

(56) References Cited

U.S. PATENT DOCUMENTS

| 4,448,075 A | 5/1984 | Takemura et al. |
| 5,327,895 A | 7/1994 | Hashimoto et al. |
| 6,833,823 B2 * | 12/2004 | Sakita .................. G09G 3/2932 345/60 |
| 6,974,417 B2 | 12/2005 | Lockwood et al. |
| 9,279,785 B2 | 3/2016 | Zhang |

(Continued)

FOREIGN PATENT DOCUMENTS

| EP | 0796669 A2 | 9/1997 |
| EP | 0829714 A1 | 3/1998 |

(Continued)

OTHER PUBLICATIONS

Row-Column Addressed Arrays for Nondestructive Evaluation Applications, Kirkpatrick et al., IEEE TRansactions of Ultrasonics, and frequency control, vol. ^6, No. 6, Jun. 2019 (Year: 2019).*

(Continued)

*Primary Examiner* — Jacques M Saint Surin
(74) *Attorney, Agent, or Firm* — Schwegman Lundberg & Woessner, P.A.

(57) ABSTRACT

An ultrasound probe can detect flaws in an object in a non-destructive manner. The probe includes a row-column addressed (RCA) array with a plurality of row and column electrodes. The row and column electrodes are configurable to have at least four states: 1) a transmission state, 2) a reception state, 3) a ground state, and 4) a high impedance state. The probe also includes a control circuit to operate the RCA array in different transmission and reception configurations.

21 Claims, 8 Drawing Sheets

(56) References Cited

U.S. PATENT DOCUMENTS

| | | |
|---|---|---|
| 2008/0289425 A1 | 11/2008 | Dijkstra et al. |
| 2008/0309200 A1 | 12/2008 | Melandso et al. |
| 2016/0015361 A1 | 1/2016 | Osawa |
| 2017/0003384 A1* | 1/2017 | Christiansen ......... B06B 1/0292 |
| 2018/0164418 A1 | 6/2018 | Zemp et al. |
| 2018/0246207 A1 | 8/2018 | Brown et al. |
| 2018/0271493 A1 | 9/2018 | Jensen et al. |
| 2019/0050618 A1* | 2/2019 | Khuri-Yakub ..... G06K 9/00906 |
| 2019/0242854 A1 | 8/2019 | Matsui et al. |
| 2019/0302256 A1* | 10/2019 | Bouzari ................ B06B 1/0622 |
| 2021/0302388 A1 | 9/2021 | Zhang et al. |
| 2021/0311179 A1* | 10/2021 | Christiansen ....... G01S 7/52046 |

FOREIGN PATENT DOCUMENTS

| | | |
|---|---|---|
| WO | WO-2021195757 A1 | 10/2021 |
| WO | WO-2021195758 A1 | 10/2021 |

OTHER PUBLICATIONS

"U.S. Appl. No. 16/833,897, Response filed Mar. 7, 2022 to Non Final Office Action dated Dec. 9, 2021", 8 pgs.

"U.S. Appl. No. 16/833,897, Notice of Allowance dated Apr. 8, 2022", 5 pgs.

"U.S. Appl. No. 16/833,897, Non Final Office Action dated Dec. 9, 2021", 11 pgs.

"International Application Serial No. PCT/CA2021/050417, International Search Report dated Jun. 10, 2021", 4 pgs.

"International Application Serial No. PCT/CA2021/050417, Written Opinion dated Jun. 10, 2021", 4 pgs.

"International Application Serial No. PCT/CA2021/050418, International Search Report dated Jul. 5, 2021", 3 pgs.

"International Application Serial No. PCT/CA2021/050418, Written Opinion dated Jul. 5, 2021", 5 pgs.

* cited by examiner

ULTRASOUND PROBE WITH ROW-COLUMN ADDRESSED ARRAY

TECHNICAL FIELD

The present disclosure generally relates to ultrasound probes for inspecting test objects using a row-column addressed ("RCA") array.

BACKGROUND

Ultrasound technology can be used for inspecting materials (e.g., pipes) in a non-destructive manner. One application can be detection of flaws or imperfections in a spot weld, a common technique for joining two pieces of metal used in various manufacturing processes. A stick weld (also sometimes referred to as a stuck weld, a kissing bond, or a corona bond) is one example of a welding imperfection. In a stick. weld, although the two pieces of metal are joined together, a weld nugget is not fully formed. A stick weld can occur due to insufficient heating during the welding process. A stick weld can be difficult to detect because, in some instances, the echoes of the testing ultrasound wave can be confused with those of a good weld because a stick weld can be acoustically transparent.

Some inspection techniques, such as using a two-dimensional transducer, can have limitations with respect to inspecting materials. For example, a two-dimensional transducer and generally-available processing techniques may present a tradeoff between resolution, acoustic frequency, and a lack of focusing. As an illustrative example, use of a two-dimensional transducer typically cannot provide a very high-resolution image, obtained using a high frequency, and providing high focus throughout the image to display the granular details of the object under test.

BRIEF DESCRIPTION OF THE DRAWINGS

Various ones of the appended drawings merely illustrate example implementations of the present disclosure and should not be considered as limiting its scope.

DETAILED DESCRIPTION

Detecting flaws and imperfections at difficult locations in a non-destructive manner can provide a challenge for generally available inspection techniques. The inventors have recognized, among other things, that such a challenge can be addressed at least in part by an inspection probe with a configurable row-column addressed (RCA) array as described below. Examples of the present invention allow for more robust inspection techniques operable in multiple modes to find hard-to-detect flaws. Examples of the present invention can provide a high-resolution and high-focused image at a high frequency rate, showing details unattainable by generally available inspection techniques.

Figure 1:
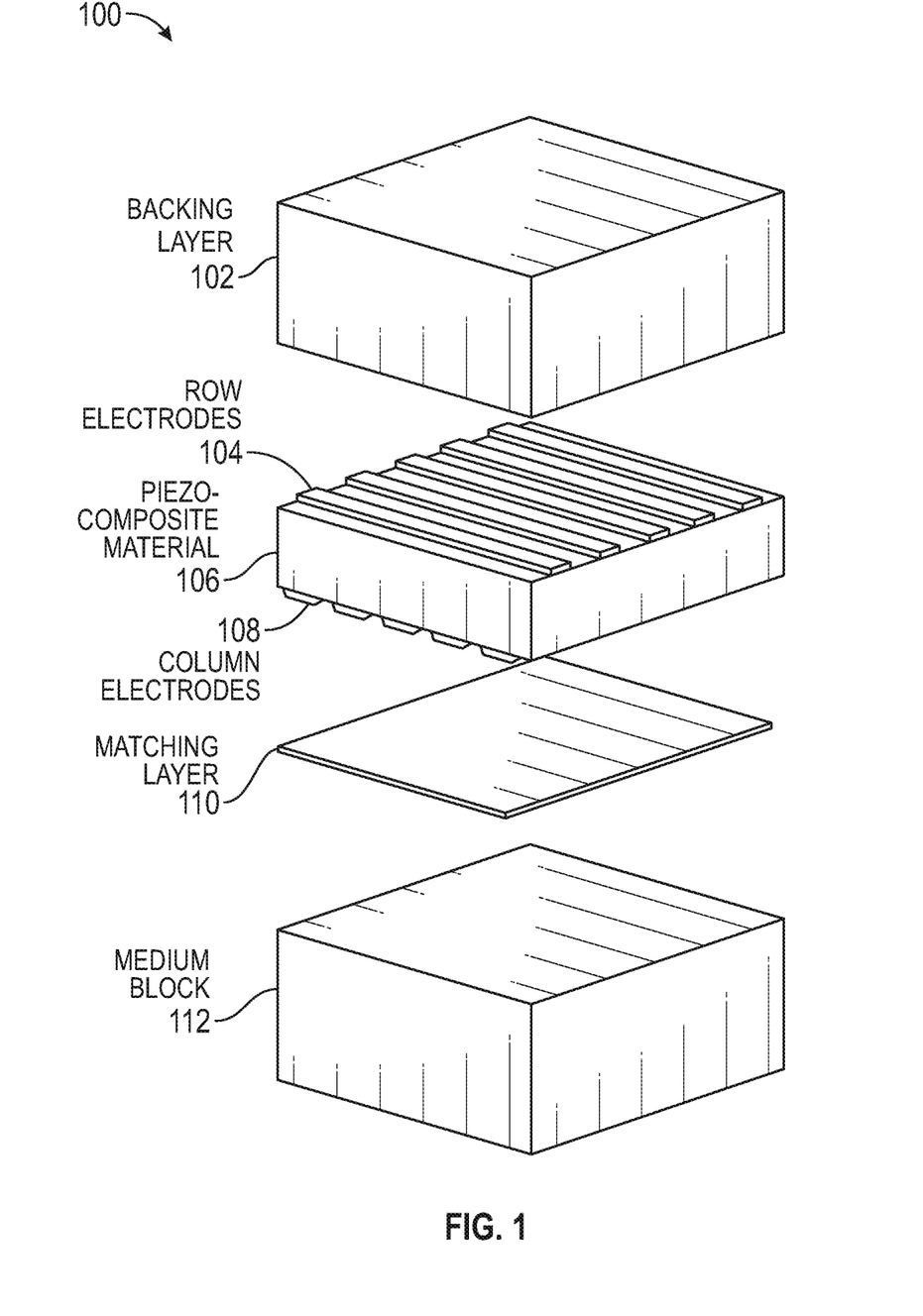
FIG. 1 illustrates an RCA array according to an example of the present invention.

FIG. 1 illustrates an RCA array 100 according to an example of the present invention. The RCA array 100 may include a backing layer 102, row electrodes 104, a piezo-composite material 106, column electrodes 108, a matching layer 110, and a medium block 112. The backing layer 102 may be provided on a top side of the RCA array 100. The row electrodes 104 and column electrodes 108 may be attached to opposing sides of the piezo-composite material 106 using a variety of coupling techniques. For example, the row and column electrodes 104, 108 may be imprinted directly on the piezo-composite material 106 or may be provided on a flexible circuit, which is then connected to the piezo-composite material 106. For example, channels and elements may be provided on the piezo-composite material 106 coupled by a flexible printed circuit board. The piezo-composite material 106 may be monolithic or may be segmented into smaller regions.

The row electrodes 104 may include a plurality of line electrodes arranged in parallel, and the column electrodes 108 may include a plurality of line electrodes arranged in parallel. The row electrodes 104 and column electrodes 108 may be arranged substantially perpendicular or orthogonal to each other, forming an array with elements or pixels provided at the intersections of the row and column electrodes 104, 108. As explained below, the row and column electrodes 104, 108 may generate and transmit ultrasound waves and/or may receive reflections or echoes of those ultrasound waves.

The matching layer 110 may be provided underneath the column electrodes 108. The matching layer 110 may provide acoustic impedance matching And the medium block 112 may be provided on a bottom side of the RCA array 100. A medium block 110, for example, may be provided as a wedge.

Figure 2:
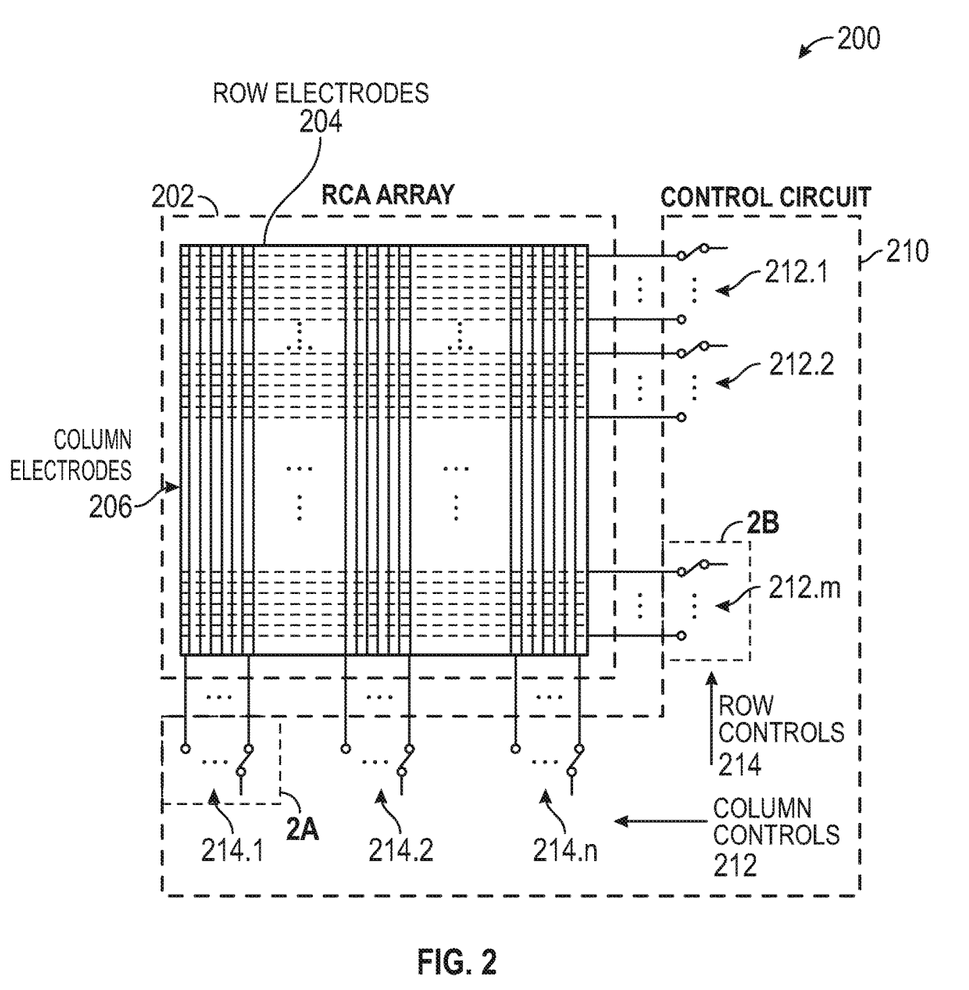
FIG. 2 illustrates a block diagram of an ultrasound probe according to an example of the present invention.

FIG. 2 illustrates a schematic block diagram of an ultrasound probe 200 according to an example of the present invention. The ultrasound probe 200 may include an RCA array 202 and a control circuit 210. For example, the RCA array 202 may be provided as the RCA array 100 of FIG. 1 described above. The RCA array 202 may include column electrodes 204 and row electrodes 206. The row electrodes 204 may include M number of line electrodes arranged in parallel, and the column electrodes may include N number of line electrodes arranged in parallel; hence, the RCA array 202 may include M×N array of elements or pixels.

The control circuit 210 may be coupled to the RCA array 202 and may control the operations of the RCA array 202. The control circuit 210 may be provided as an integrated circuit providing multilevel pulse signals and other states. The control circuit 210 may include a first set of switches 212.1-212.M, with each switch of the first set of switches 212.1-212.M coupled to a respective row of the row electrodes 204.

Figure 2A:
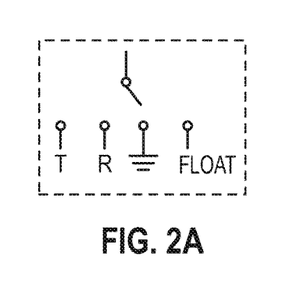
FIG. 2A illustrates a switch configuration according to an example of the present invention.

FIG. 2A illustrates a switch of the first set of switches 212.1-212.M according to an example of the present invention. Each switch of the first set of switches 212.1-212.M may have four possible connections, thereby operating the coupled row electrode in one of four states depending on the switch connection: 1) a transmission state, 2) a reception state, 3) a ground state, and 4) a high impedance (float) state.

Figure 2B:
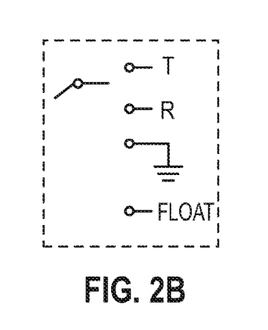
FIG. 2B illustrates a switch configuration according to an example of the present invention.

The control circuit 210 may include a second set of switches 214.1-214.N, with each switch of the second switches 214.1-214.N coupled to a respective column of the column electrodes 206. FIG. 2B illustrates a switch of the second set of switches 214.1-214.n according to an example of the present invention. Each switch of the second set of switches 214.1-214.M may have four possible connections, thereby operating the coupled column electrode in one of four states depending on the switch connection: 1) a transmission state, 2) a reception state, 3) a ground state, and 4) a high impedance (float) state.

In a transmission state, the respective switch may couple the row/column electrode to an excitation signal, e.g., a high voltage pulse signal. In a reception state, the respective switch may couple the row/column electrode to an output of the RCA array 202. The output of the RCA array 202 may be coupled to signal processing components, such as an analog-to-digital converter and a processor, to process the received signal from the RCA array 202. For example, the processor may execute a time of flight (ToF) technique using the output of the RCA array. In a ground state, the respective switch may couple the row/column electrode to ground, which may be a reference node at a fixed reference potential. In a high impedance state, the respective switch may couple the row/column electrode to a high impedance, such that the coupled row/column electrode may electrically function in substantially an open state (i.e., a floating node).

The switches 212.1-212.M, 214.1-214.N may be provided as multiplexers, logic devices, or the like. Moreover, different pulse signals may be provided in the transmission state. The different pulse signals may have different magnitudes and/or different duty cycles.

Figure 3A:
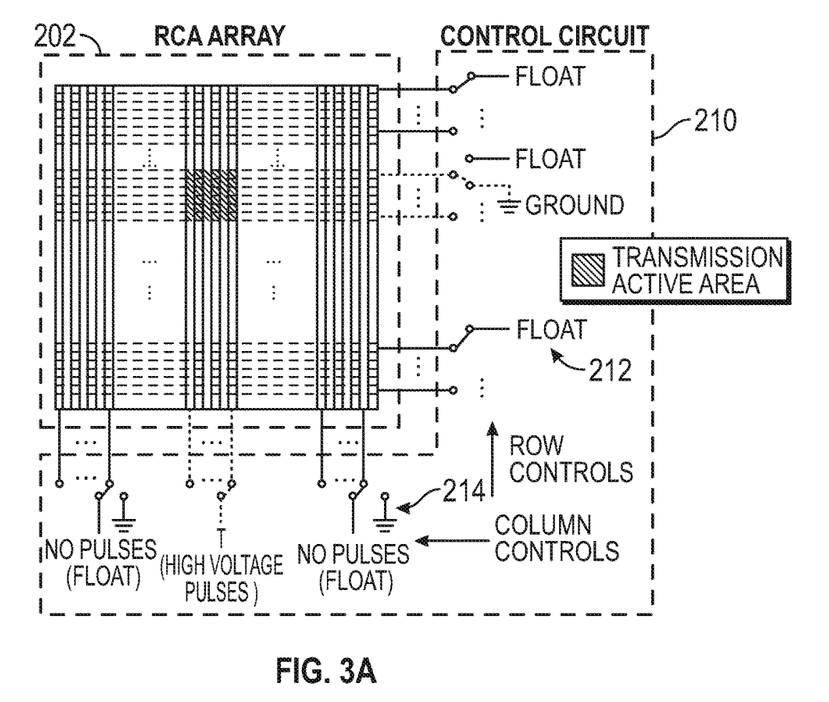
FIG. 3A illustrates a transmission configuration of an ultrasound probe according to an example of the present invention.
Figure 3B:
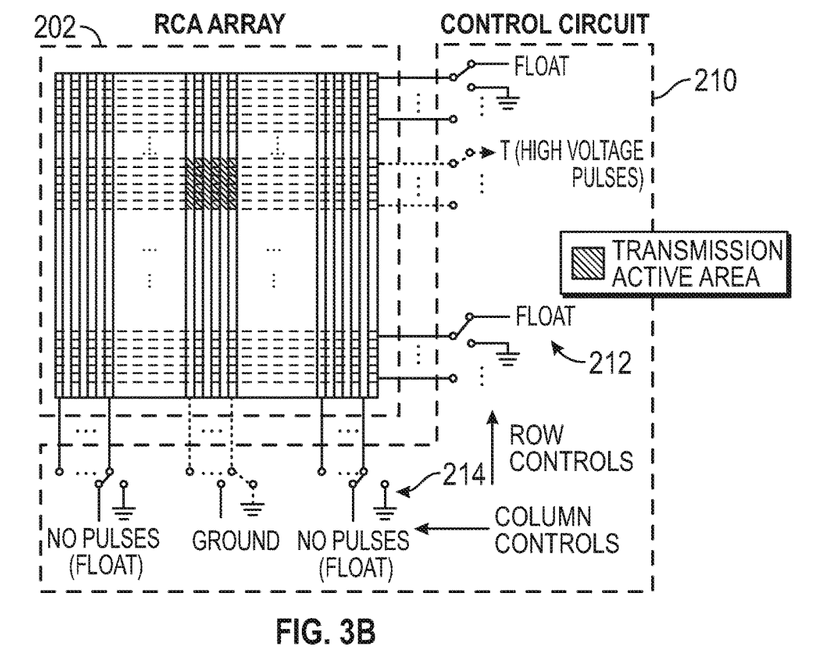
FIG. 3B illustrates a transmission configuration of an ultrasound probe according to an example of the present invention.

FIGS. 3A and 3B illustrate different transmission configurations of the ultrasound probe 200 according to examples of the present invention. FIG. 3A illustrates a first transmission configuration, where selected column electrodes may be driven while selected row electrodes may be coupled to ground, such that the intersection of the selected column and row electrodes define a transmission aperture. Here, a first set of column electrode switches 214 may set the selected column electrodes to a transmission state by coupling to an excitation signal, such as a pulse signal, and a second set of column electrode switches 214 may set the remaining column electrodes to a high impedance state. Similarly, a first set of row electrode switches 212 may set the selected row electrodes to a ground state, and a second set of row electrode switches 212 may set the remaining row electrodes to a high impedance state.

FIG. 3B illustrates a second transmission configuration, where selected row electrodes may be driven while selected column electrodes may be coupled to ground, such that the intersection of the selected column and row electrodes define the transmission aperture. Here, a first set of row electrode switches 212 may set the selected row electrodes to a transmission state by coupling to an excitation signal, such as a pulse signal, and a second set of row electrode switches 212 may set the remaining row electrodes to a high impedance state. Similarly, a first set of column electrode switches 214 may set the selected column electrodes to a ground state, and a second set of column electrode switches 214 may set the remaining column electrodes to a high impedance state.

The intersection of the first set of rows and columns, in either the first or second transmission configuration, may define a transmission aperture. If there are no delays, the transmission aperture may operate as a single transmitting element. As described further below, delays may be added for beam steering, for example.

Figure 4A:
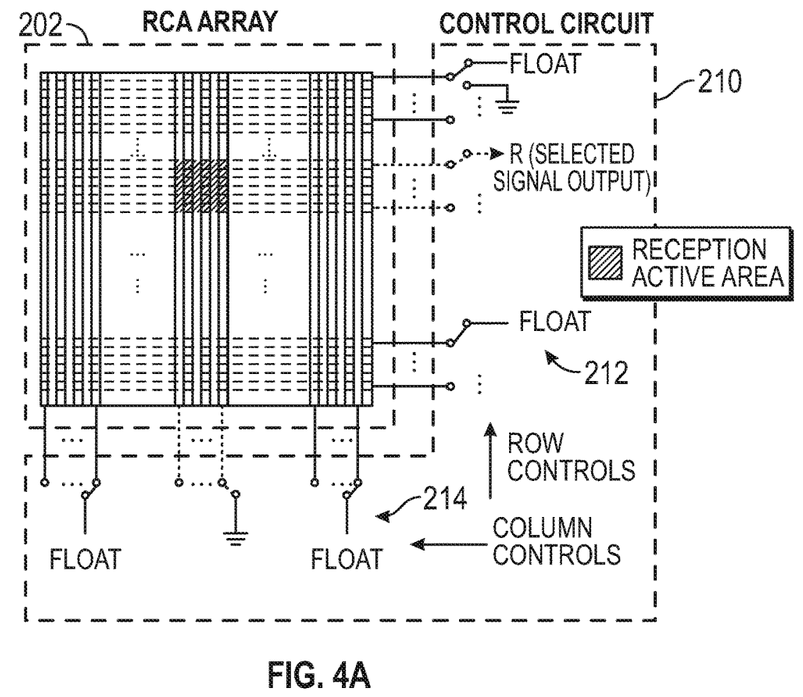
FIG. 4A illustrates a reception configuration of an ultrasound probe according to an example of the present invention.
Figure 4B:
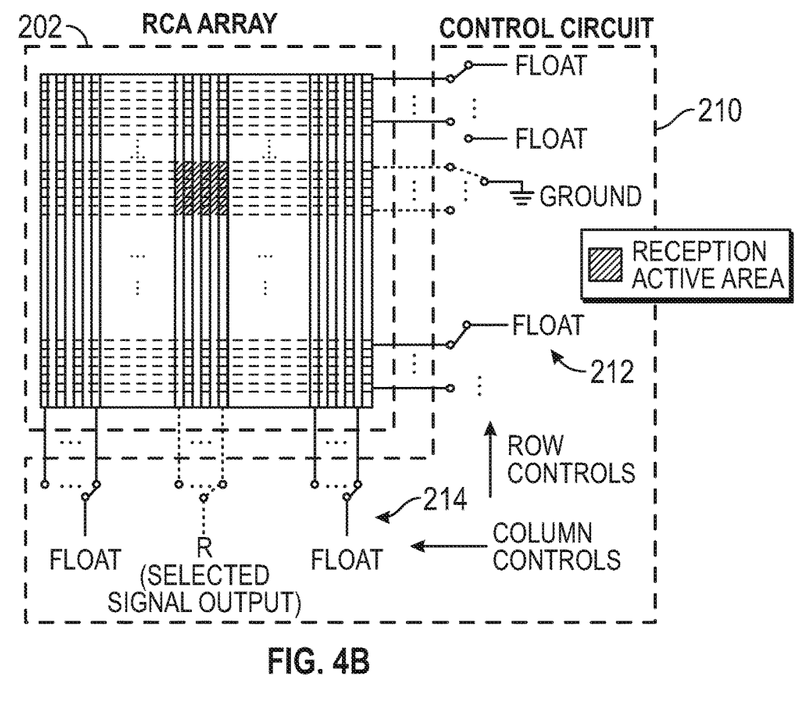
FIG. 4B illustrates a reception configuration of an ultrasound probe according to an example of the present invention.

FIGS. 4A and 4B illustrate different reception configurations of the ultrasound probe 200 according to examples of the present invention. FIG. 4A illustrates a first reception configuration, where selected row electrodes may be used for reception while selected column electrodes may be coupled to ground, such that the intersection of the selected row and column electrodes define a reception aperture. Here, a first set of row electrode switches 212 may set the selected row electrodes to a reception state by coupling to an output of the RCA array 202, and a second set of row electrode switches 212 may set the remaining row electrodes to a high impedance state. Similarly, a first set of column electrode switches 214 may set the selected column electrodes to a ground state, and a second set of column electrode switches 214 may set the remaining column electrodes to a high impedance state.

FIG. 4B illustrates a second reception configuration, where selected column electrodes may be used for reception while selected row electrodes may be coupled to ground, such that the intersection of the selected column and row electrodes define the reception aperture. Here, a first set of column electrode switches 214 may set the selected column electrodes to a reception state by coupling to an output of the RCA array 202, and a second set of column electrode switches 214 may set the remaining row electrodes to a high impedance state. Similarly, a first set of row electrode switches 212 may set the selected row electrodes to a ground state, and a second set of row electrode switches 212 may set the remaining column electrodes to a high impedance state. The intersection of the first set of rows and columns, in either the first or second reception configuration, may define a reception aperture.

If there are no delays, the reception aperture may operate as a single receiving element. As described further below, delays may be added for beam steering, for example.

During an inspection operation, the transmission and reception apertures may be provided at different locations within the RCA array 202. For example, during transmission, the control circuit 210 may provide a transmission aperture at a first location but may receive the reflections or echoes of that transmission at a reception aperture at a second different location.

As described herein, the control circuit 210, row electrode switches 212, and column electrode switches 214 may operate the RCA array 202 in different transmission and reception configurations, providing more robust inspection options. As described in further detail below, this expanded control may allow different inspection techniques, such as scanning across different axes, beam steering in transmission and/or reception, etc.

Figure 5:
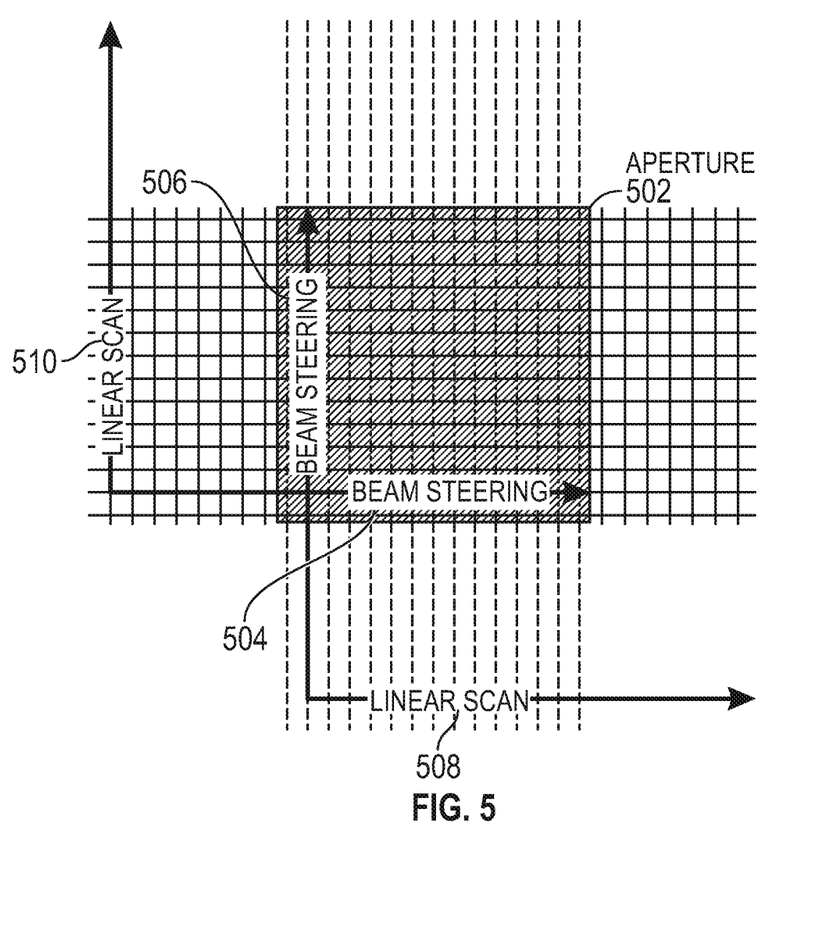
FIG. 5 illustrates RCA inspection techniques according to an. example of the present invention.

FIG. 5 illustrates different inspection techniques using an RCA array according to examples of the present invention. In FIG. 5, an aperture 502 is shown, which may be a transmission or reception aperture and may be provided by the techniques described herein. Beam steering may be performed on either axis 504, 506. For example, the aperture 502 may provide an active orientation for transmission or reception beam steering. For transmission beam steering, the control circuit may drive the columns or rows, depending on the transmission configuration, with delays between respective columns or rows.

In the first transmission configuration, the control circuit may drive the first set of columns as described above but with delays between the respective columns amongst the first set of columns. Likewise, in the second transmission configuration, the control circuit may drive the first set of rows as described above but with delays between the respective rows amongst the first set of rows.

With respect to reception beam steering in the first reception configuration, the control circuit may receive on the first set of columns as described above but with delays between the respective columns amongst the first set of columns. In the second reception configuration, the control circuit may receive on the first set of rows as described above but with delays between the respective rows amongst the first set of rows.

Scanning may be performed on either axis 508, 510. For example, the aperture 502 may provide an active orientation for transmission or reception scanning, and the aperture 502 may be moved along either axis 508, 510. For example, for transmission scanning, after transmitting using the aperture 502 at a first location during a first duration, the aperture 502 may be moved along either axis 508 or axis 510 for the next transmission duration and then moved again for the subsequent transmission duration and so on. The transmission apertures may be sequenced along a specified axis. Moreover, the transmission aperture may be set and moved anywhere in the total aperture area; for example, the transmission aperture may be moved in both directions like a raster scan. Reception apertures may be sequenced in a similar fashion.

Scanning may be performed in conjunction with beam steering. For example, during the transmission and/or reception durations in scanning modes, beam steering, as described above, may also be implemented (e.g., driving or receiving with delays within the aperture). Beam steering may be independent of the scanning, i.e., the axes for beam steering may be different from the axes for scanning.

Figure 6A:
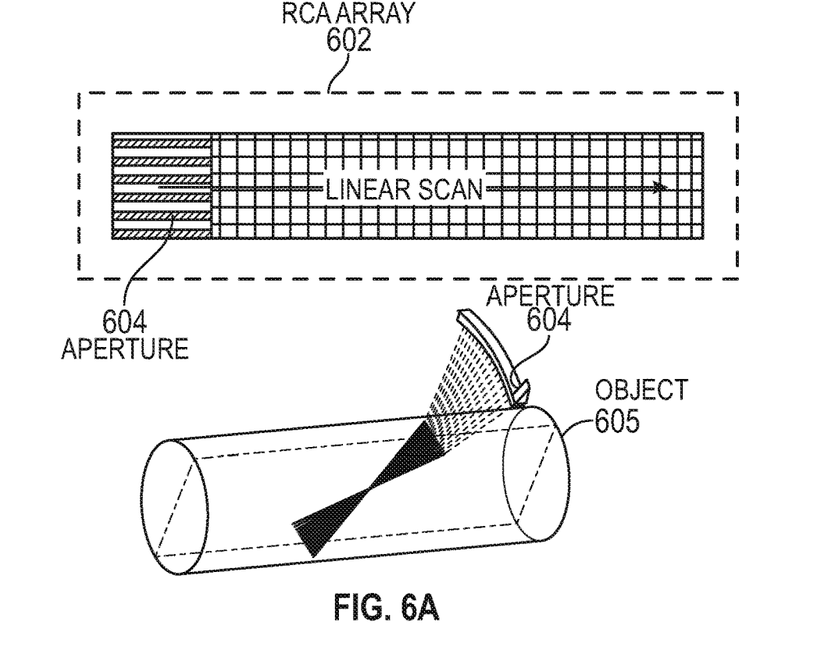
FIG. 6A illustrates an RCA array inspection of a testing object according to an example of the present invention.

FIG. 6A illustrates an RCA array inspecting an object for a transverse flaw according to an example of the present invention. FIG. 6A shows an RCA array 602 with a transmission aperture 604 transmitting ultrasound beams through a testing object 605. In this example, the RCA array 602 is operated in linear scan mode in the horizontal axis using beam steering techniques described herein. The testing object 605 may be a bar or pipe or the like. As shown, the beam steering orientation allows detection of transverse flaws (or imperfections) with respect to the axis of the testing object 605. Moreover, using signal processing techniques, the location and size of the flaw may be determined. The beam steering methods described herein allows scanning in an orthogonal direction by flipping an active axis of the probe using the different transmission and reception configurations described herein.

Figure 6B:
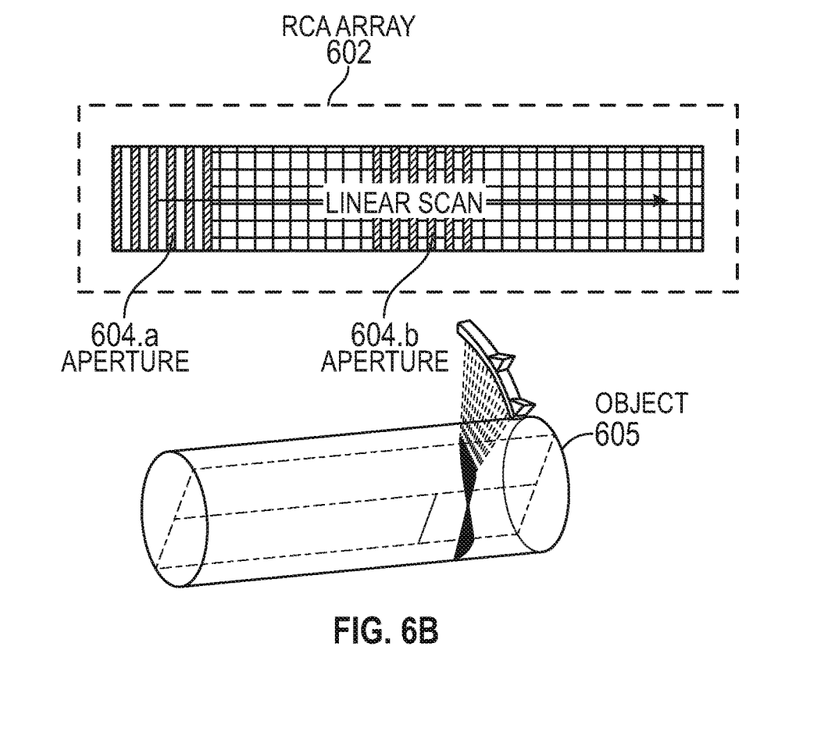
FIG. 6B illustrates an RCA array inspection of a testing object according to an example of the present invention.

FIG. 6B illustrates an RCA array inspecting an object for a transverse flaw according to an example of the present invention. FIG. 6B shows an RCA array 602 with transmission apertures 604.a, 604.b transmitting ultrasound beams through a testing object 605 operated in a linear scan mode in the horizontal axis using a different beam steering orientation to detect longitudinal flaws as compared to the beam steering orientation of aperture 604 shown in FIG. 6A, which was used to detect transverse flaws. In this example, two apertures 604.a, 604.b are shown because the probe is configured to perform parallel (simultaneous) firings. However, it should be understood that a single aperture or more than two simultaneous apertures may be used. Moreover, multiple simultaneous apertures may be used with other examples or implementations described herein.

Figure 7:
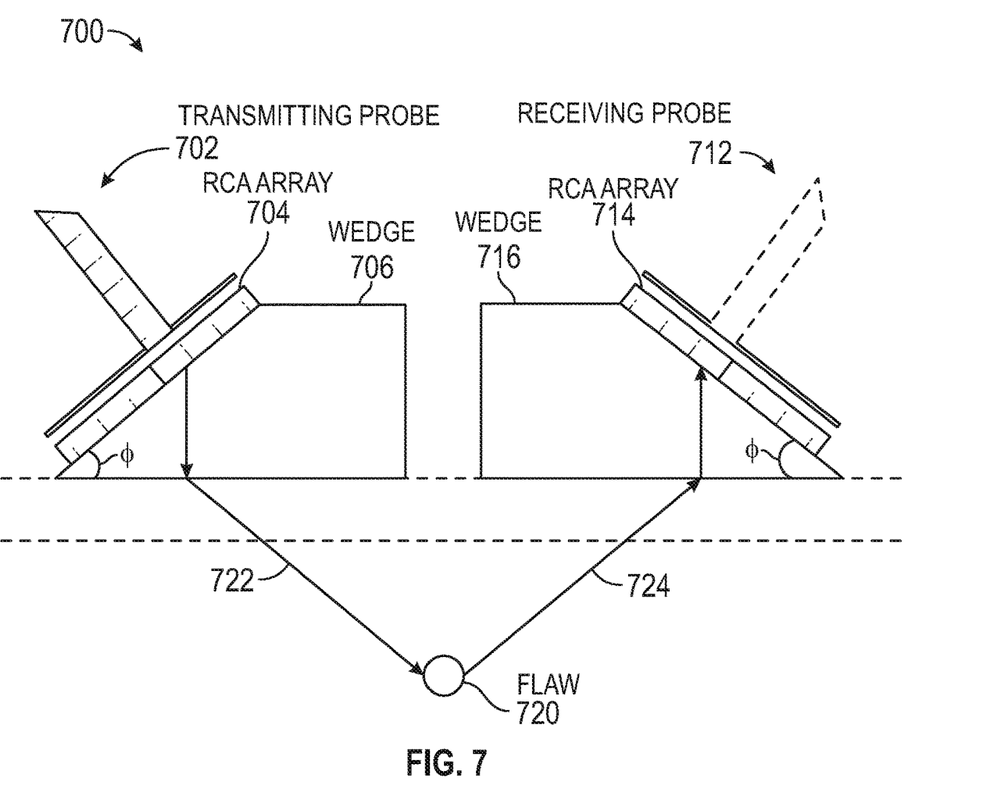
FIG. 7 illustrates an inspection system according to an example of the present invention.

FIG. 7 illustrates an inspection system 700 according to an example of the present invention. The inspection system 700 may include a transmitting probe 702 and a receiving probe 712. The transmitting probe 702 may include an RCA array 704 and a wedge 706, provided at a first wedge angle φ. The receiving probe 706 may include an RCA array 714 and a wedge 716, provided at a second wedge angle φ. The RCA arrays 704, 714 in the probes may be implemented as described above with reference to FIGS. 1-6. The transmitting and receiving probes 702, 712 may be placed on a surface of a testing object face-to-face. The transmitting probe 702 may transmit ultrasound wave(s) 722 through the testing object and may reflect off a flaw 720 in the testing object. Reflections or echoes 720 of the ultrasound wave(s) 722 from the flaw 722 may be received by the receiving probe 714. In addition to the RCA arrays 704, 714, the first and wedge angles may also be configurable to conform to the surface of the testing object and to transmit and receive the ultrasound waves at desired angles.

The inspection system 700 may be used in different modes. For example, the inspection system 700 may be used in Pulse-Echo (PE) mode for detecting longitudinal flaws. In another example, the inspection system 700 may be used to in Pitch-Catch (PC) mode for detecting transverse flaws. In PC mode, the transmitting probe 702 may transmit (pitch) ultrasound wave(s) into a testing object, and the receiving probe 712 may receive (catch) the reflected echoes.

Figure 8:
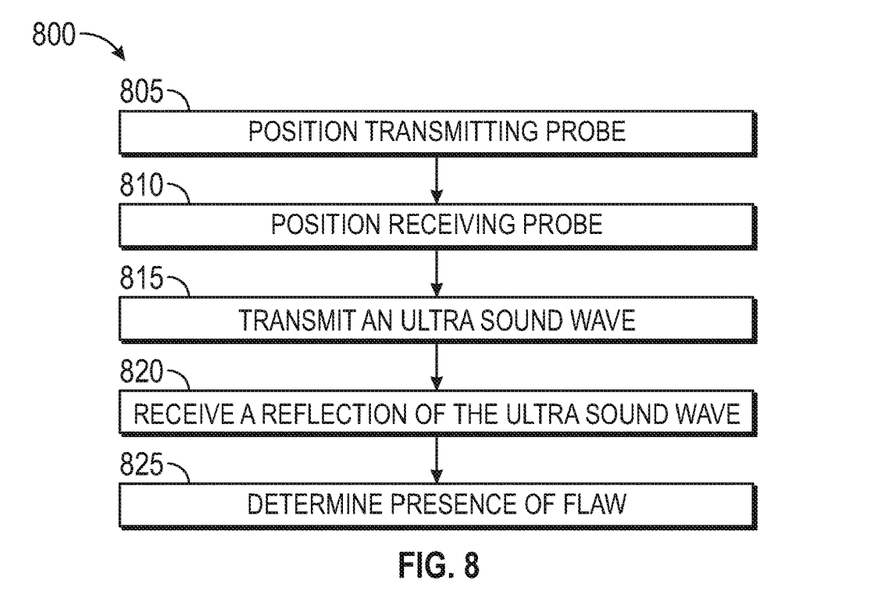
FIG. 8 is a flow diagram for detecting flaws in a testing object according to an example of the present invention.

FIG. 8 illustrates a flow diagram of example portions of a method 800 for detecting flaws in a testing object. At step 805, a transmitting probe may be positioned on a surface of a testing object. The transmitting probe may be placed at a first wedge angle. At step 810, a receiving probe may be positioned on the surface of the testing object. The receiving probe may be placed at a second wedge angle. The receiving probe may be positioned facing the transmitting probe.

At step 815, the transmitting probe may transmit ultrasound wave(s) into the testing object using an RCA array provided in the transmitting probe. The transmitting probe may do so by selecting a transmission aperture in a first or second transmission configuration as described above, for example, with reference to FIGS. 3A-3B. Moreover, the transmitting probe may operate in a scan and/or beam steering modes as described above, for example, with reference to FIG. 5. The aperture position and/or beam steering angle may be calculated; the calculation may be based on whether an inner surface (ID) or an outer surface flaw is being detected, as shown below with reference to FIGS. 9 and 10. Also, the mode of the inspection system (e.g., PC, PE) may be selected.

At step 820, the receiving probe may receive reflection(s) of the ultrasound wave(s) from the testing object using an RCA array provided in the receiving probe. The receiving probe may do so by selecting a reception aperture in a first or second reception configuration as described above, for example, with reference to FIGS. 4A-4B. Moreover, the receiving probe may operate in a scan and/or beam steering modes as described above, for example, with reference to FIG. 5.

At step 825, the receiving probe may process the received reflection(s) to determine the presence or absence of a flaw inside the testing object, such as a longitudinal or transverse flaw. For example, the received reflections may be used to determine the location and size of the flaw. In an example, the two-probe technique described herein may be used for Girth weld inspections, for which conventional techniques approximately use up to ten probes.

Using two probes may provide additional benefits such as providing more flexibility, allowing for detection of flaws that may be difficult to detect with a single probe. For example, in addition to detecting longitudinal flaws in a testing object, using two probes may allow for detection of hard-to-detect transverse flaws.

Figure 9:
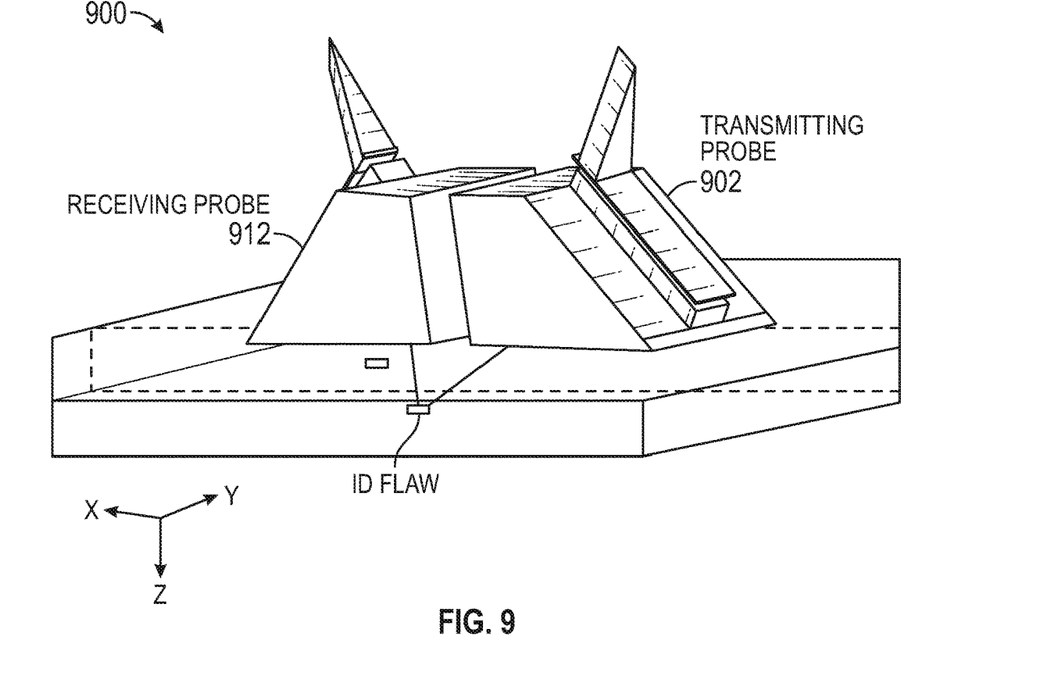
FIG. 9 illustrates an inspection system according to an example of the present invention.

FIG. 9 illustrates an inspection system 900 detecting an. inner surface (ID) transverse flaw according to an example of the present invention. The inspection system 900 may include a transmitting probe 902 and a receiving probe 912, which may include respective RCA arrays using the transmitting and receiving techniques described herein. The inspection system 900 may perform forward and backward inspection. As illustrated, the transmitting probe 902 may transmit ultrasound wave(s) into the testing object via a transmission aperture using the techniques described herein, including using different transmission configurations, beam steering, and/or scanning. The receiving probe 912 may receive the reflections of the ultrasound wave(s) from a flaw in the testing object using via a reception aperture using the techniques described herein, including using different reception configurations, beam steering, and/or scanning. Here, the received reflections may indicate that the flaw is an transverse ID flaw.

Figure 10:
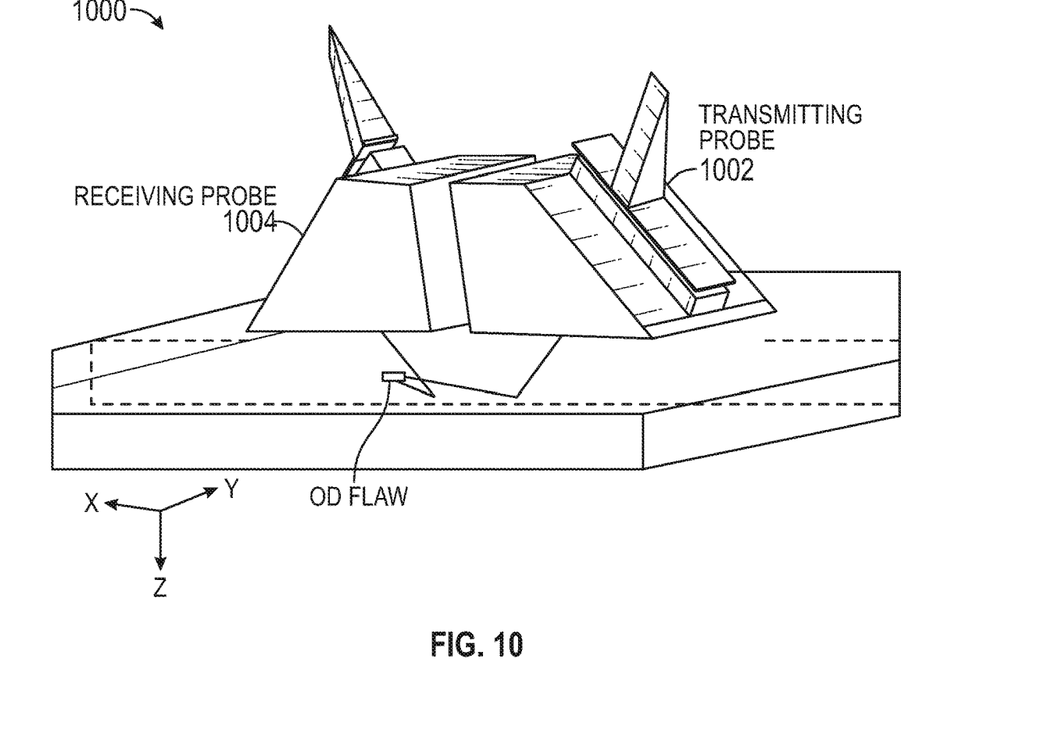
FIG. 10 illustrates an inspection system according to an example of the present invention.

FIG. 10 illustrates an inspection system 1000 detecting an outer surface (OD) transverse flaw according to an example of the present invention. The inspection system 1000 may include a transmitting probe 1002 and a receiving probe 1012, which may include respective RCA arrays using the transmitting and receiving techniques described herein. The inspection system 1000 may perform forward and backward inspection. As illustrated, the transmitting probe 1002 may transmit ultrasound wave(s) into the testing object via a transmission aperture using the techniques described herein, including using different transmission configurations, beam steering, and/or scanning. The receiving probe 1012 may receive the reflections of the ultrasound wave(s) from a flaw in the testing object using via a reception aperture using the techniques described herein, including using different reception configurations, beam steering, and/or scanning. Here, the received reflections may indicate that the flaw is an OD transverse flaw.

With respect to FIGS. 9 and 10, the use of beam steering from an RCA probe as described herein and selection of an appropriate wedge angle, e.g., an angle for generating naturally refracted beams of (for example, 60 degrees) shear waves in testing object such as steel, allows generating a forward skewed beam that is out of the probe's normal incidence plane. Hence, two probes, as described herein, facing each other and working in PC mode may be used to inspect an ID or OD transverse flaw.

Several examples or implementations of the invention are specifically illustrated and/or described herein. However, it will be appreciated that modifications and variations of the invention are covered by the above teachings and within the purview of the appended claims without departing from the intended scope of the invention.

Although the implementations of the present disclosure have been described with reference to specific example implementations, it will be evident that various modifications and changes may be made to these implementations without departing from the broader scope of the inventive subject matter. Accordingly, the specification and drawings are to be regarded in an illustrative rather than a restrictive sense. The accompanying drawings that form a part hereof show, by way of illustration, and not of limitation, specific implementations in which the subject matter may be practiced. The implementations illustrated are described in sufficient detail to enable those skilled in the art to practice the teachings disclosed herein. Other implementations may be used and derived therefrom, such that structural and logical substitutions and changes may be made without departing from the scope of this disclosure. This Detailed Description, therefore, is not to be taken in a limiting sense, and the scope of various implementations is defined only by the appended claims, along with the full range of equivalents to which such claims are entitled.

Example 1. An apparatus comprising: a row-column addressed (RCA) array defining a plurality of transducer elements arranged in rows and columns to transmit and receive ultrasound waves; a control circuit coupled to the RCA array to drive the RCA array in a transmission mode and to receive an electrical representation of an ultrasound wave in a reception mode, in the transmission mode, the control circuit configured to operate the RCA array in different transmission configurations, wherein in a first transmission configuration, drive, with a pulse signal, a first set of columns coupled to a first set of rows, which are coupled to ground, and in a second transmission configuration, drive, with the pulse signal, the first set of rows coupled to the first set of columns, which are coupled to ground, wherein a first crossing of the first sets of columns and rows defines a transmission aperture; in the reception mode, the control circuit configured to operate the RCA array in different reception configurations, wherein in a first reception configuration, receive the electrical representation on a second set of columns coupled to a second set rows, which are coupled to ground, and in a second reception configuration, receive the electrical representation on the second set rows coupled to the second set of columns, which are coupled to ground, wherein a second crossing of the second sets of columns and rows defines a reception aperture.

Example 2. The apparatus of example 1, the control circuit further configured to in each of the transmission and reception configuration, couple remaining rows and columns to a high impedance.

Example 3. The apparatus of any of examples 1-2, the control circuit further configured to operate in a scan mode, wherein, over a first duration, the control circuit provides the transmission aperture and the reception aperture, and, over a second duration, the control circuit provides a second transmission aperture and a second reception aperture.

Example 4. The apparatus of any of examples 1-3, wherein the transmission apertures are sequenced along a specified axis.

Example 5. The apparatus of any of examples 1-4, wherein the transmission apertures are sequenced based on a raster scan.

Example 6. The apparatus of any of examples 1-5, the control circuit further configured to operate in a transmission beam steering mode, wherein the first crossing defines an active orientation for transmission beam steering and wherein the control circuit is further configured to, in the first transmission configuration, drive the first set of columns with at least one delay between respective ones of columns amongst the first set of columns and, in the second transmission configuration to, drive the first set of rows with at least one delay between respective ones of rows amongst the first set of rows.

Example 7. The apparatus of any of examples 1-6, the control circuit further configured to operate in a reception beam steering mode, wherein the second crossing defines an active orientation for reception beam steering and wherein the control circuit is further configured to, in the first reception configuration, receive on the second set of columns with at least one delay between respective ones of columns amongst the second set of columns and, in the second reception configuration, receive on the second set of rows with at least one delay between respective ones of rows amongst the second set of rows.

Example 8. The apparatus of any of examples 1-7, wherein the transmission and reception apertures are different in at least one of spatial extent or location within the array.

Example 9. A method comprising: in a transmission mode: selecting a first or second transmission configuration, wherein in the first transmission configuration, driving a first set columns in a row-column addressed (RCA) array with a pulse signal, wherein the first set of columns are coupled to a first set of rows, which are coupled to ground, and in the second transmission configuration, driving the first set of rows with the pulse signal, wherein the first set of rows are coupled to the first set of columns, which are coupled to ground, wherein a first crossing of the first sets of columns and rows defines a transmission aperture; and transmitting at least one ultrasound wave using the selected transmission configuration; and in a reception mode: selecting a first or second reception configuration, wherein in the first reception configuration, receiving an electrical representation of an ultrasound wave on a second set of columns coupled to a second set of rows, which are coupled to ground, and in the second reception configuration, receiving the electrical representation on the second set of rows coupled to the second set of columns, which are coupled to ground, wherein a second crossing of the second sets of columns and rows defines a reception aperture; and receiving the electrical representation using the selected reception configuration.

Example 10. The method of example 9, wherein in each of the transmission and reception configuration, couple remaining rows and columns to a high impedance.

Example 11. The method of any of examples 9-10, further comprising operating in a scan mode, wherein, over a first duration, providing the transmission aperture and the reception aperture, and, over a second duration, providing a second transmission aperture and a second reception aperture.

Example 12. The method of any of examples 9-11, wherein the transmission apertures are sequenced along a specified axis.

Example 13. The method of any of examples 9-12, wherein the transmission apertures are sequenced based on a raster scan.

Example 14. The method of any of examples 9-13, further comprising operating in a transmission beam steering mode, wherein the first crossing defines an active orientation for transmission beam steering and wherein, in the first transmission configuration, driving the first set of columns with at least one delay between respective ones of columns amongst the first set of columns and, in the second transmission configuration to, driving the first set of rows with at least one delay between respective ones of rows amongst the first set of rows.

Example 15. The method of any of examples 9-14, wherein. the second crossing defines an active orientation for reception beam steering and wherein, in the first reception configuration, receiving on the second set of columns with at least one delay between respective ones of columns amongst the second set of columns and, in the second reception configuration, receiving on the second set of rows with at least one delay between respective ones of rows amongst the second set of rows.

Example 16. The method of any of examples 9-15, wherein the transmission and reception apertures are different in at least one of spatial extent or location within the array.

Example 17. An inspection probe, comprising: a row-column addressed (RCA) array with a plurality of elements to transmit and receive ultrasound waves, wherein respective row electrodes and column electrodes are configurable to have at least four states: 1) a transmission state, 2) a reception state, 3) a ground state, and 4) a high impedance state; a control circuit configured to operate the RCA array in a transmission and reception mode, wherein in a transmission mode, the control circuit is configured to place the plurality of row and column electrodes in different states in a first configuration providing a transmission aperture, wherein in a reception mode, the control circuit is configured to place the plurality of row electrodes and column electrodes in different states in a second configuration providing a reception aperture.

Example 18. The probe of example 17, the control circuit is further configured to operate in a scan mode, wherein, over a first duration, the control circuit provides the transmission aperture, and, over a second duration, the control circuit provides a second transmission aperture Example 19. The probe of any of examples 17-18, the control circuit is further configured to operate in a transmission beam steering. Mode.

Example 20. The probe of any of examples 17-19, the control circuit is further configured to operate in a reception beam steering mode Example 21. An inspection system comprising: a pair of probes, including a transmitting and a receiving probe, configured to be placed on a testing surface; the transmitting probe to transmit an ultrasound wave, including a first row-column addressed (RCA) array, a first wedge positioned to establish the first RCA array at a first wedge angle relative to the testing surface; and the receiving probe to receive a reflection of the ultrasound wave, including a second RCA array, and a second wedge positioned to establish the second RCA array at a second wedge angle relative to the testing surface.

Example 22. The inspection system of example 21, wherein the first RCA array includes a plurality of row and column electrodes, wherein the row and column electrodes are configurable to have at least four states: 1) a transmission state, 2) a reception state, 3) a ground state, and 4) a high impedance state.

Example 23. The inspection system of any of examples 21-22, wherein the second RCA array includes a plurality of row and column electrodes, wherein the row and column electrodes are configurable to have at least four states; 1) a transmission state, 2) a reception state, 3) a ground state, and 4) a high impedance state.

Example 24. The inspection system of any of examples 21-23, wherein the first and second RCA arrays each includes a plurality of row and column electrodes, wherein the row and column electrodes are configurable to have at least four states: 1) a transmission state, 2) a reception state, 3) a ground state, and 4) a high impedance state.

Example 25. The inspection system of any of examples 21-24, wherein the transmitting probe is configured to operate in a linear scan mode.

Example 26. The inspection system of any of examples 21-25, wherein the transmitting probe is configured to operate in a transmission beam steering mode.

Example 27. The inspection system of any of examples 21-26, wherein the receiving probe is configured to operate in a reception beam steering mode.

Example 28. A method to detect flaws in a testing object, the method comprising: placing a first probe on a surface of the testing object at a first wedge angle; placing a second probe on the surface at a second wedge angle; transmitting, from the first probe, an ultrasound wave into the testing object using a first row-column addressed (RCA) array; and receiving, at the second probe, a reflection of the ultrasound wave using a second RCA array.

Example 29. The method of example 28, wherein the ultrasound wave is transmitted through a transmission aperture, which is defined by an intersection of a subset of rows and columns of the first RCA array.

Example 30. The method of any of examples 28-29, further comprising transmitting the ultrasound wave in a first or second transmission configuration, wherein in a first transmission configuration, driving the subset of columns with a pulse signal, coupling the subset of rows to ground, and coupling remaining rows and columns to a high impedance; and in a second transmission configuration, driving the subset of rows with a pulse signal, coupling the subset of columns to ground, and coupling remaining rows and columns to a high impedance.

Example 31. The method of any of examples 28-30, wherein the reflection is received through a reception aperture, which is defined by an intersection of a subset of rows and columns of the second RCA array.

Example 32. The method of any of examples 28-31, further comprising receiving the reflection in a first or second reception configuration, wherein in a first reception configuration, receiving the reflection on the subset of columns, coupling the subset of rows to ground, and coupling remaining rows and columns to a high impedance; and in a second reception configuration, receiving the reflection on the subset of rows with a pulse signal, coupling the subset of columns to ground, and coupling remaining rows and columns to a high impedance.

Example 33. The method of any of examples 28-32, further comprising: operating the first probe in a linear scan mode.

Example 34. The method of any of examples 28-33, further comprising: operating the second probe in a linear scan mode.

Example 35. The method of any of examples 28-34, further comprising: operating the first probe in a beam steering mode.

Example 36. The method of any of examples 28-35, further comprising: operating the second probe in a beam steering mode.

Example 37. A method to detect imperfections in a testing object, the method comprising: transmitting, from a transmitting probe, an ultrasound wave into a testing object using a first row-column addressed (RCA) array through a transmission aperture defined by selected elements in the first RCA array; and receiving, at a receiving probe positioned face-to-face with the transmitting probe, a reflection of the ultrasound wave using a second RCA array through a reception aperture defined by selected elements in the second RCA array.

Example 38. The method of example 37, further comprising: placing the transmitting probe at a first wedge angle on a surface of the testing object; and placing the receiving probe at a second wedge angle on the surface of the testing object.

Example 39. The method of any of examples 37-38, further comprising: selecting a first or second transmission configuration, wherein in a first transmission configuration, driving a subset of columns with a pulse signal, coupling a subset of rows to ground, and coupling remaining rows and columns to a high impedance; and in the second transmission configuration, driving the subset of rows with a pulse signal, coupling the subset of columns to ground, and coupling remaining rows and columns to a high impedance.

Example 40. The method of any of examples 37-39, further comprising: selecting a first or second reception configuration, wherein in the first reception configuration, receiving the reflection on a subset of columns, coupling a subset of rows to ground, and coupling remaining rows and columns to a high impedance; and in the second reception configuration, receiving the reflection on the subset of rows with a pulse signal, coupling the subset of columns to ground, and coupling remaining rows and columns to a high impedance.

What is claimed is:

1. An apparatus comprising:
   a row-column addressed (RCA) array defining a plurality of transducer elements arranged in rows and columns to transmit and receive ultrasound waves;
   a control circuit coupled to the RCA array to drive the RCA array in a transmission mode and to receive an electrical representation of an ultrasound wave in a reception mode,
   in the transmission mode, the control circuit configured to operate the RCA array in different transmission configurations, wherein
   in a first transmission configuration, drive, with a pulse signal, a first set of columns coupled to a first set of rows, which are coupled to ground, and
   in a second transmission configuration, drive, with the pulse signal, the first set of rows coupled to the first set of columns, which are coupled to ground,
   wherein a first crossing of the first sets of columns and rows defines a transmission aperture;
   in the reception mode, the control circuit configured to operate the RCA array in different reception configurations, wherein
   in a first reception configuration, receive the electrical representation on a second set of columns coupled to a second set rows, which are coupled to ground, and
   in a second reception configuration, receive the electrical representation on the second set rows coupled to the second set of columns, which are coupled to ground,
   wherein a second crossing of the second sets of columns and rows defines a reception aperture.

2. The apparatus of claim 1, the control circuit further configured to
   in each of the transmission and reception configuration, couple remaining rows and columns to a high impedance.

3. The apparatus of claim 1, the control circuit further configured to operate in a scan mode, wherein, over a first duration, the control circuit provides the transmission aperture and the reception aperture, and, over a second duration, the control circuit provides a second transmission aperture and a second reception aperture.

4. The apparatus of claim 3, wherein the transmission apertures are sequenced along a specified axis.

5. The apparatus of claim 3, wherein the transmission apertures are sequenced based on a raster scan.

6. The apparatus of claim 1, the control circuit further configured to operate in a transmission beam steering mode, wherein the first crossing defines an active orientation for transmission beam steering and wherein the control circuit is further configured to, in the first transmission configuration, drive the first set of columns with at least one delay between respective ones of columns amongst the first set of columns and, in the second transmission configuration to, drive the first set of rows with at least one delay between respective ones of rows amongst the first set of rows.

7. The apparatus of claim 1, the control circuit further configured to operate in a reception beam steering mode, wherein the second crossing defines an active orientation for reception beam steering and wherein the control circuit is further configured to, in the first reception configuration, receive on the second set of columns with at least one delay between respective ones of columns amongst the second set of columns and, in the second reception configuration, receive on the second set of rows with at least one delay between respective ones of rows amongst the second set of rows.

8. The apparatus of claim 1, wherein the transmission and reception apertures are different in at least one of spatial extent or location within the array.

9. A method, comprising:
in a transmission mode:
selecting a first or second transmission configuration, wherein
in the first transmission configuration, driving a first set columns in a row-column addressed (RCA) array with a pulse signal, wherein the first set of columns are coupled to a first set of rows, which are coupled to ground, and
in the second transmission configuration, driving the first set of rows with the pulse signal, wherein the first set of rows are coupled to the first set of columns, which are coupled to ground,
wherein a first crossing of the first sets of columns and rows defines a transmission aperture; and
transmitting at least one ultrasound wave using the selected transmission configuration; and
in a reception mode:
selecting a first or second reception configuration, wherein
in the first reception configuration, receiving an electrical representation of an ultrasound wave on a second set of columns coupled to a second set of rows, which are coupled to ground, and
in the second reception configuration, receiving the electrical representation on the second set of rows coupled to the second set of columns, which are coupled to ground, wherein a second crossing of the second sets of columns and rows defines a reception aperture; and
receiving the electrical representation using the selected reception configuration.

10. The method of claim 9, wherein in each of the transmission and reception configuration, couple remaining rows and columns to a high impedance.

11. The method of claim 9, further comprising operating in a scan mode, wherein, over a first duration, providing the transmission aperture and the reception aperture, and, over a second duration, providing a second transmission aperture and a second reception aperture.

12. The method of claim 11, wherein the transmission apertures are sequenced along a specified axis.

13. The method of claim 11, wherein the transmission apertures are sequenced based on a raster scan.

14. The method of claim 9, further comprising operating in a transmission beam steering mode, wherein the first crossing defines an active orientation for transmission beam steering and wherein, in the first transmission configuration, driving the first set of columns with at least one delay between respective ones of columns amongst the first set of columns and, in the second transmission configuration to, driving the first set of rows with at least one delay between respective ones of rows amongst the first set of rows.

15. The method of claim 9, wherein the second crossing defines an active orientation for reception beam steering and wherein, in the first reception configuration, receiving on the second set of columns with at least one delay between respective ones of columns amongst the second set of columns and, in the second reception configuration, receiving on the second set of rows with at least one delay between respective ones of rows amongst the second set of rows.

16. The method of claim 9, wherein the transmission and reception apertures are different in at least one of spatial extent or location within the array.

17. An inspection probe, comprising:
a row-column addressed (RCA) array with a plurality of elements to transmit and receive ultrasound waves, wherein respective row electrodes and column electrodes are configurable to have at least four states:
1) a transmission state, 2) a reception state, 3) a ground state, and 4) a high impedance state;
a control circuit configured to operate the RCA array in a transmission and reception mode,
wherein in a transmission mode, the control circuit is configured to place the plurality of row and column electrodes in different states in a first transmission configuration or a second transmission configuration providing a transmission aperture,
wherein in the first transmission configuration a first set columns are set to the transmission state and a first set of rows are set to the ground state, and
wherein in the second transmission configuration the first set of rows are set to the transmission state and the first columns are set to the ground state,
wherein in a reception mode, the control circuit is configured to place the plurality of row electrodes and column electrodes in different states in a reception configuration providing a reception aperture.

18. The probe of claim 17, the control circuit is further configured to operate in a scan mode, wherein, over a first duration, the control circuit provides the transmission aperture, and, over a second duration, the control circuit provides a second transmission aperture.

19. The probe of claim 17, the control circuit is further configured to operate in a transmission beam steering mode.

20. The probe of claim 17, the control circuit is further configured to operate in a reception beam steering mode.

21. The probe of claim 17, wherein the control circuit is configured to place the plurality of row electrodes and column electrodes in different states in a first reception configuration or a second reception configuration,
  wherein in the first reception configuration a second set rows are set to the reception state and a second set of columns are set to the ground state, and
  wherein in the second reception configuration the second set of columns are set to the reception state and the second set of rows are set to the ground state.

* * * * *

UNITED STATES PATENT AND TRADEMARK OFFICE
CERTIFICATE OF CORRECTION

PATENT NO. : 11,448,621 B2
APPLICATION NO. : 16/833793
DATED : September 20, 2022
INVENTOR(S) : Zhang et al.

It is certified that error appears in the above-identified patent and that said Letters Patent is hereby corrected as shown below:

On the Title Page

In item (72), in "Inventors", in Column 1, Line 1, delete "Quebec" and insert --Québec-- therefor In item (72), in "Inventors", in Column 1, Line 2, delete "Quebec" and insert --Québec-- therefor Signed and Sealed this
Nineteenth Day of September, 2023

Katherine Kelly Vidal
*Director of the United States Patent and Trademark Office*